United States Patent [19]
Chiang

[11] Patent Number: 5,864,766
[45] Date of Patent: Jan. 26, 1999

[54] CELLULAR TELEPHONE BATTERY WITH AUTO-ANSWERING AND HAND-FREE FUNCTIONS

[76] Inventor: Chih-Cheng Chiang, No. 162, Ta-Yu Str., Hsi-Tun Dist., Taichung, Taiwan

[21] Appl. No.: 689,685

[22] Filed: Aug. 13, 1996

[51] Int. Cl.$^6$ .............................. H04B 1/38; H04M 1/00
[52] U.S. Cl. ........................ 455/572; 455/569; 379/420; 379/432
[58] Field of Search .......................... 455/572, 90, 550, 455/557, 425, 556, 575, 569; 379/67, 88, 420, 428, 432, 433, 447, 446, 455; 429/98

[56] References Cited

U.S. PATENT DOCUMENTS

| | | | |
|---|---|---|---|
| 4,481,382 | 11/1984 | Villa-Real | 455/412 |
| 5,333,176 | 7/1994 | Burke et al. | 455/569 |
| 5,590,414 | 12/1996 | Marui et al. | 455/575 |
| 5,633,573 | 5/1997 | Van Phuoc et al. | 320/5 |
| 5,636,265 | 6/1997 | O'Connell et al. | 455/412 |
| 5,655,017 | 8/1997 | Fishman | 379/420 |
| 5,664,012 | 9/1997 | Chen | 379/420 |
| 5,786,106 | 7/1998 | Armani | 429/98 |

OTHER PUBLICATIONS

Lifestyle Fascination, Holiday Express '95 Issue, pp. 9, Dec. 1995.

*Primary Examiner*—Dwayne D. Bost
*Assistant Examiner*—Tracy M. Legree
*Attorney, Agent, or Firm*—Bacon & Thomas, PLLC

[57] ABSTRACT

A cellular telephone battery having the functions of auto answering, hand-free listening and speaking, low power control, power wake up control, battery protection, and quick charging. The battery includes an auto-answer and hand-free control unit connected to the mainframe of the cellular telephone, a set of control buttons, a microphone, an indicator light, and a speaker respectively mounted on the outside for operation by the user to control the auto-answer and hand-free control unit, the auto-answer and hand-free control unit including an encoder/decoder/storage unit and two exchanging units controlled by the control buttons to achieve the specified functions.

5 Claims, 5 Drawing Sheets

5,864,766

CELLULAR TELEPHONE BATTERY WITH AUTO-ANSWERING AND HAND-FREE FUNCTIONS

BACKGROUND OF THE INVENTION

The present invention relates to cellular telephones, and relates more specifically to a multifunction cellular telephone battery which provides the functions of auto-answer, hand-free, quick charging, etc.

Cellular telephones have become more and more popular nowadays, for the advantage of high mobility. Advanced cellular telephones provide many sophisticated functions to satisfy consumers' different requirements. For example, the hand-free speaking function allows a car driver to speak through the cellular telephone without holding it in hand during driving. This function has been defined in certain countries as a requisite function of cellular telephones. Due to limited space, added functions cannot be unlimitedly built in a cellular telephone. Therefore, most added functions are built outside the mainframe of the cellular telephone. However, the design of an externally built structure complicates the assembly process of the cellular telephone. If an externally built structure provides only one added function, several externally built structures shall be installed when many added functions are required. When several externally built structures are installed, the mobility of the cellular telephone will be greatly affected.

SUMMARY OF THE INVENTION

The present invention has been accomplished under the circumstances in view. It is therefore the main object of the present invention to provide a cellular telephone battery which provides the necessary working power supply to the cellular telephone, and has additional functions including auto-answer, hand-free, low power and power wake up, quick charging, etc.

According to the present invention, the multifunction cellular telephone battery provides the functions of auto answering, hand-free listening and speaking, low power control, power wake up control, battery protection, and quick charging, and is comprised of a current rectifying and voltage converting device adapted for rectifying and converting input power supply to the desired working power supply; an auto-answer and hand-free control device connected to the current rectifying and voltage converting device, the auto-answer and hand-free control device comprising a control unit connected to the mainframe of the cellular telephone, a set of control buttons, a microphone, an indicator light, a speaker, two exchanging units, and an encoder/decoder/storage unit, the control buttons and the microphone and the speaker being adapted for the user to control the operation of the auto-answer and hand-free control device, the encoder/decoder/storage unit driving the voice of the opponent out of the speaker through the exchanging units, and sending the user's voice to the opponent through the cellular telephone via the exchanging units. The encoder/decoder/storage unit has a read only memory and a random access memory adapted for storing the user's announcement and the caller's message. The control unit of the auto-answer and hand-free control device enters a low power sleep mode when the cellular telephone receives a signal to stop operation, and automatically wakes up from the lower power sleep mode when the control unit receives a signal from the cellular telephone. The quick charging function is achieved in such a manner that external power supply is monitored by the power input protection system of a rectifier thereof, then processed by the switch control, auto regulation, full wave rectification, and current switch of a charge input volume control system of the rectifier, and then monitored by a voltage switch and a temperature switch thereof, and then controlled by a main control IC thereof to charge the battery.

DETAILED DESCRIPTION OF THE PREFERRED EMBODIMENT

Figure 1:
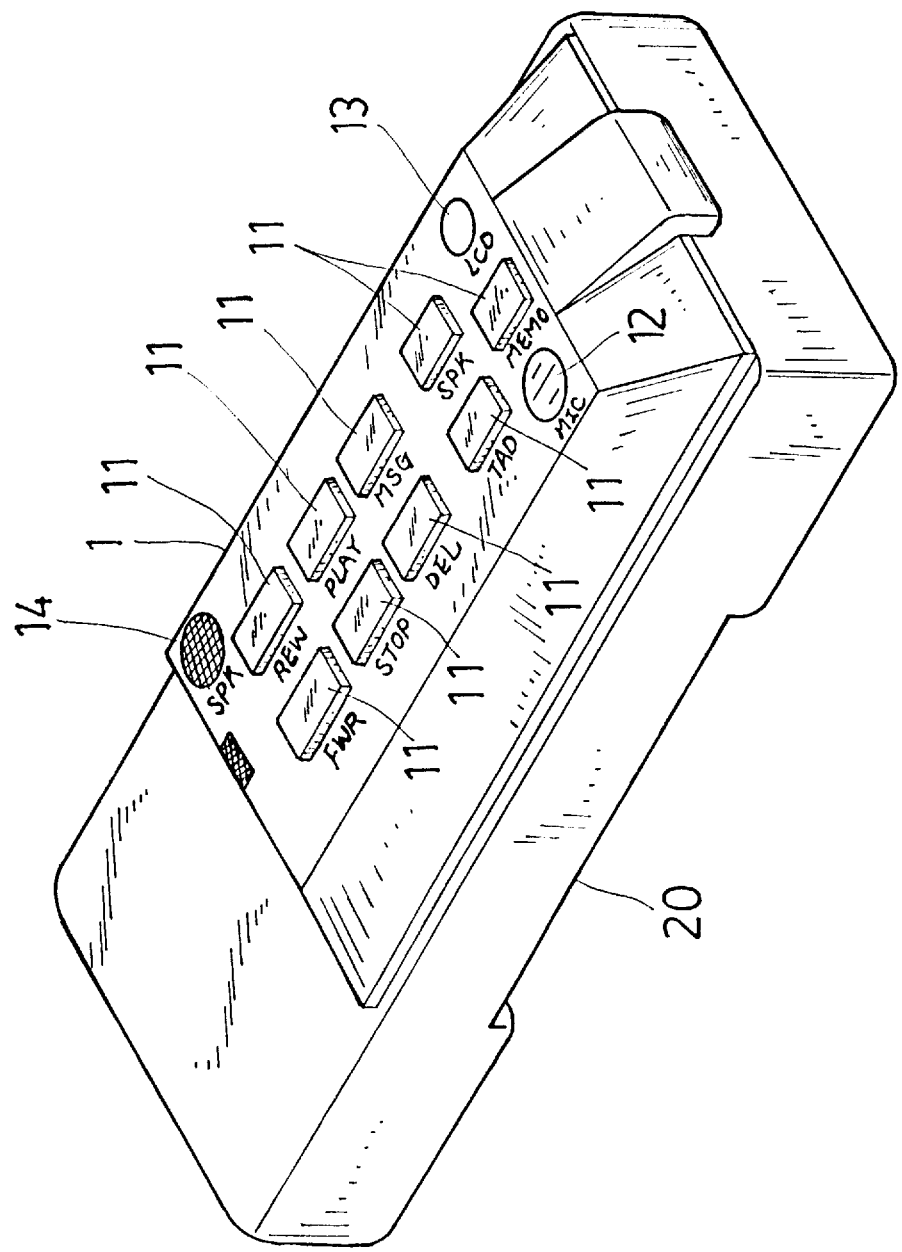
FIG. 1 is an elevational view of a multifunction cellular telephone battery according to the present invention.

Referring to FIG. 1, a multifunction cellular telephone battery in accordance with the present invention comprises a casing 1, and a battery body 10 mounted within the casing 1 and adapted for providing the necessary working power supply to the cellular telephone 20 and other accessories. Mounted on the outside of the casing 1, there are a control button unit 11, a microphone 12, an indicator light 13, and a speaker 14. The control button unit 11 comprises a SPK button, a TAD button, a MSA button, a DEL button, a PLAY button, a STOP button, a REW button, a FWD button, and a MEMO button. The functions of the buttons of the control button unit 11 will be described further.

Figure 2:
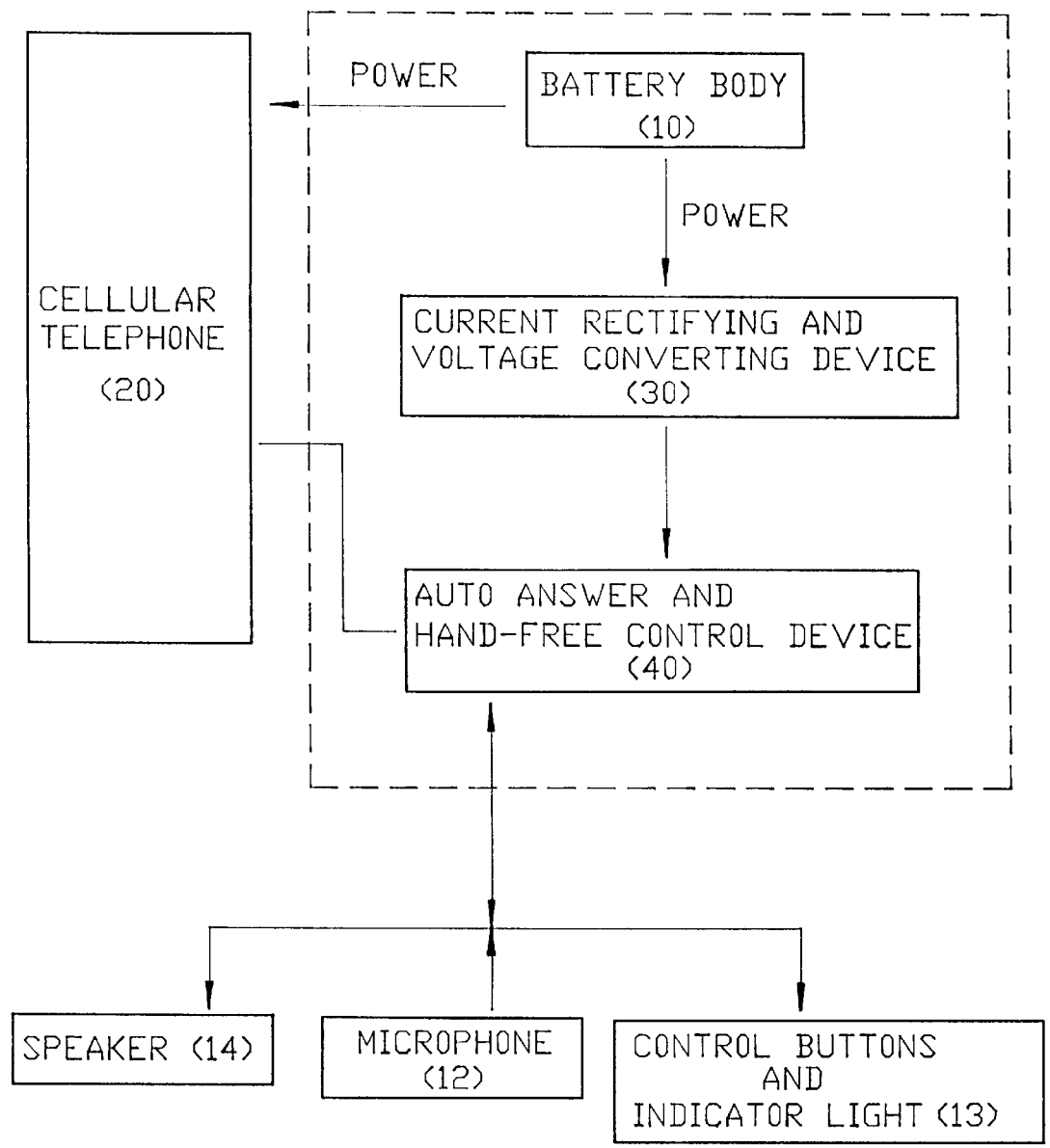
FIG. 2 is a system flow chart of the multifunction cellular telephone battery according to the present invention.
Figure 3:
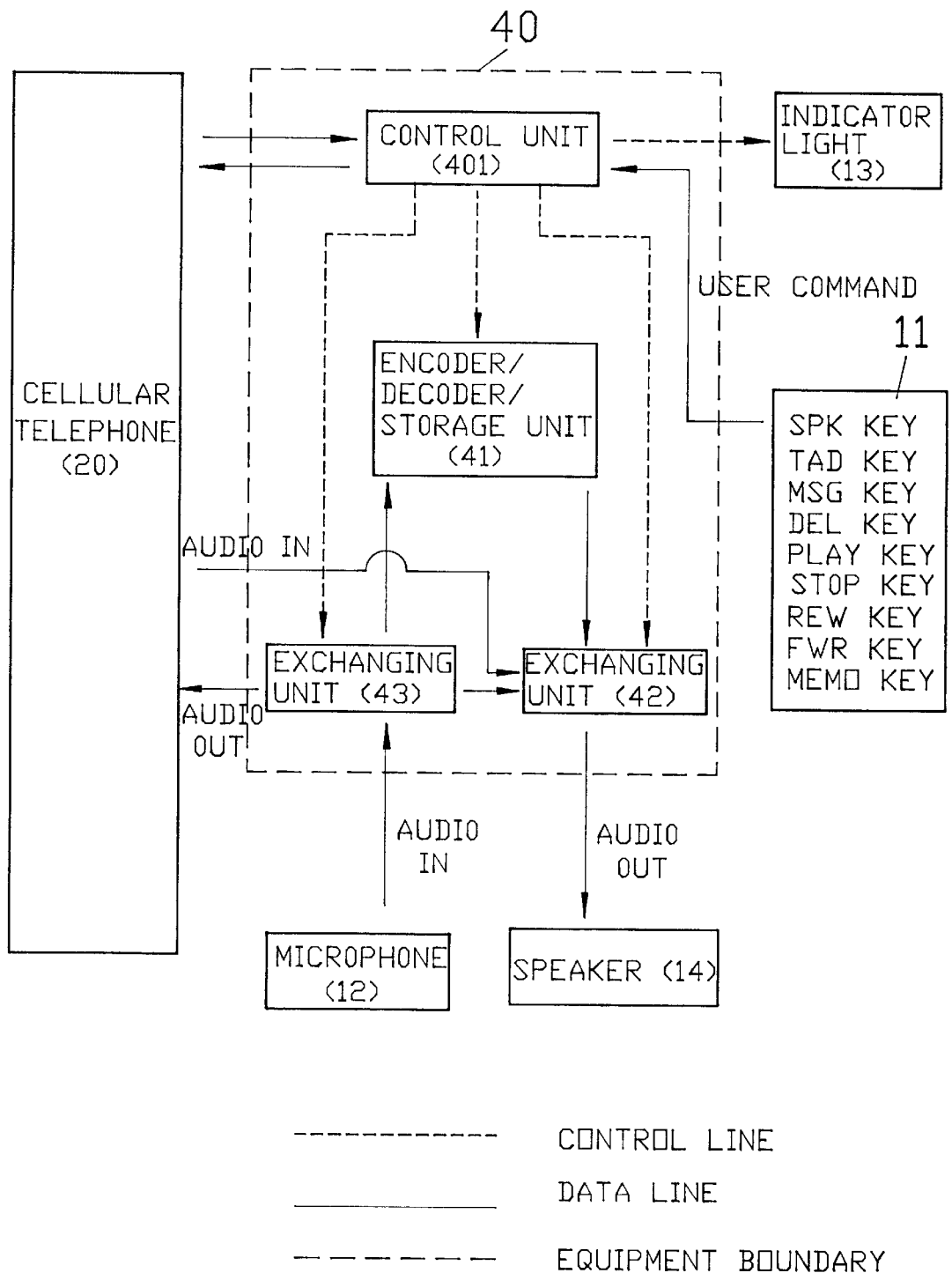
FIG. 3 is a flow chart showing the operation of auto answering and hand-free listening and speaking functions according to the present invention.

Referring to FIGS. 2 and 3, the electric power of the battery body 10 is rectified and converted by a current rectifying and voltage converting device 30 into the necessary working voltage for the auto-answer and hand-free control device 40. The auto-answer and hand-free control device 40, as shown in FIG. 3, comprises a control unit 401 connected to the mainframe of the cellular telephone 20, the control buttons 11, the indicator light 13 of the battery body 10, two exchanging units, namely, the first exchanging unit 42 and the second exchanging unit 43, and an encoder, decoder, storage unit 41. The two exchanging units 42, 43 are respectively connected to the I/0 port of the cellular telephone 20. When the SPK button of the control button unit 11 is pressed on, the voice of the opponent is transmitted from the cellular telephone 20 to the encoder, decoder, storage unit 41, and then driven out of the speaker 14, and the user's voice is allowed to be picked up by the microphone 12, then transmitted to the second exchanging unit 43, and then sent to the opponent through the cellular telephone 20. In short, the SPK button is for a hand-free listen and speak operation control; when the SPK button is pressed on, the opponent's voice is driven out of the speaker 14, and the user's voice is sent to the opponent through the cellular telephone 20 via the microphone 12; when the SPK button is pressed off, the communication is executed by the cellular telephone 20. When the MSG button is pressed on, the user can then record the desired announcement, i.e., the voice is picked up by the microphone 12, then transmitted to the encoder, decoder, storage unit 41 through the second exchanging unit 43, and then compressed and stored in a ROM (read only memory). If the TAD button is pressed on and the opponent calls the telephone, the control unit 401 turns on the cellular telephone 20, and sends the stored announcement from the ROM (read only memory) of the encoder, decoder, storage unit 41 to the opponent through the cellular telephone 20. If the opponent gives a message, the control unit 401 controls the encoder, decoder, storage unit 41 to encode the opponent's voice message, compress the encoded signal, and store the compressed signal in a RAM (random access memory), and at the same time, the opponent's voice message is driven out of the speaker 14 through the first exchanging units 42, enabling any person in presence to hear the opponent's message. When a message is stored in the encoder, decoder, storage unit 41, the control unit 401 drives the indicator light 13 to flash. When the flashing of the indicator light 13 is viewed, the user can then press on the PLAY button to let the stored digital message be converted into voice message by the encoder, decoder, storage unit 41, and then driven out of the speaker 14 through the first exchanging unit 42. The other control buttons of the control button unit 11, such as the STOP button, the REW button, the FWR button, are to control the encoder, decoder, storage unit 41, causing it to stop playing, to rewind to the last message, to forward to the next message.

When the user presses on the MEMO button, the user's announcement can be inputted through the microphone 12, then transmitted from the second exchanging unit 43 through the first exchanging unit 42, and then stored in the RAM by the encoder, decoder, storage unit 41. The user can uses the STOP button, the REW (review) button, the FWR (forward) button, and the DEL (delete) button to control the playing of the recorded announcement.

Figure 4:
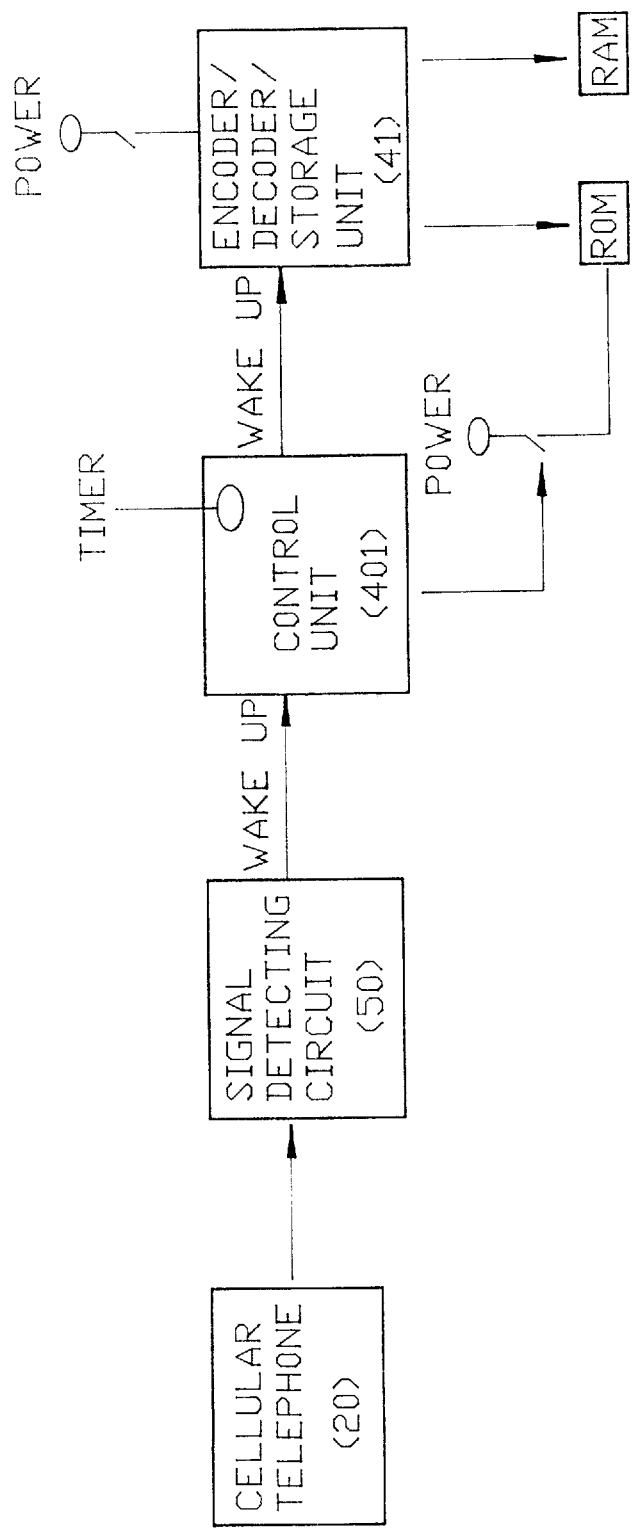
FIG. 4 is a flow chart showing the operation of the functions of lower power and wake up according to the present invention.

In order to save electric power consumption and prolong the service life of the cellular telephone battery, additional wake up and low power functions are provided. The low power function is to automatically drop power consumption to the lowest level when no signal is received by the cellular telephone, and to increase power supply to the working level when the cellular telephone receives a call. The wake up function, as illustrated in FIG. 4, enables the control unit 401 to wake up from the low power mode and to return to the normal power supply mode when the control unit 401 receives a signal from the cellular telephone or any external control message through a signal detecting circuit 50. The aforesaid signal may come directly from the transmission line of the control unit 401, or come from an external source through a signal detecting and converting circuit. The control unit 401 can also be controlled by a timer to resume power supply. The timer can be controlled through an external control line, or by the program in the memory of the control unit 401. When the control unit 401 resumes to normal power supply mode and detects an external signal (the ringing signal of the telephone, or the signal of a control button), it immediately wakes up the encoder, decoder, storage unit 41, and therefore the aforesaid functions can be performed.

When the control unit 401 receives a stop signal from the cellular telephone 20 through the signal detecting circuit 50, it enters the lower power sleep mode immediately. The control unit 401 can also be forced into the lower power sleep mode through the control of an added control button, or controlled by the timer to be turned to the lower power sleep mode a certain length of time after receiving no message. Before entering the sleep mode, the control unit 401 cuts off power supply from the encoder, decoder, storage unit 41. The announcement recorded in the ROM will not be erased when power supply is disconnected. However, the message stored in the RAM will be erased when power supply is off. If there is a message stored in the encoder, decoder, storage unit 41, the control unit 401 is turned to the receiving mode from the lower power sleep mode, so as to protect the message from being erased.

Figure 5:
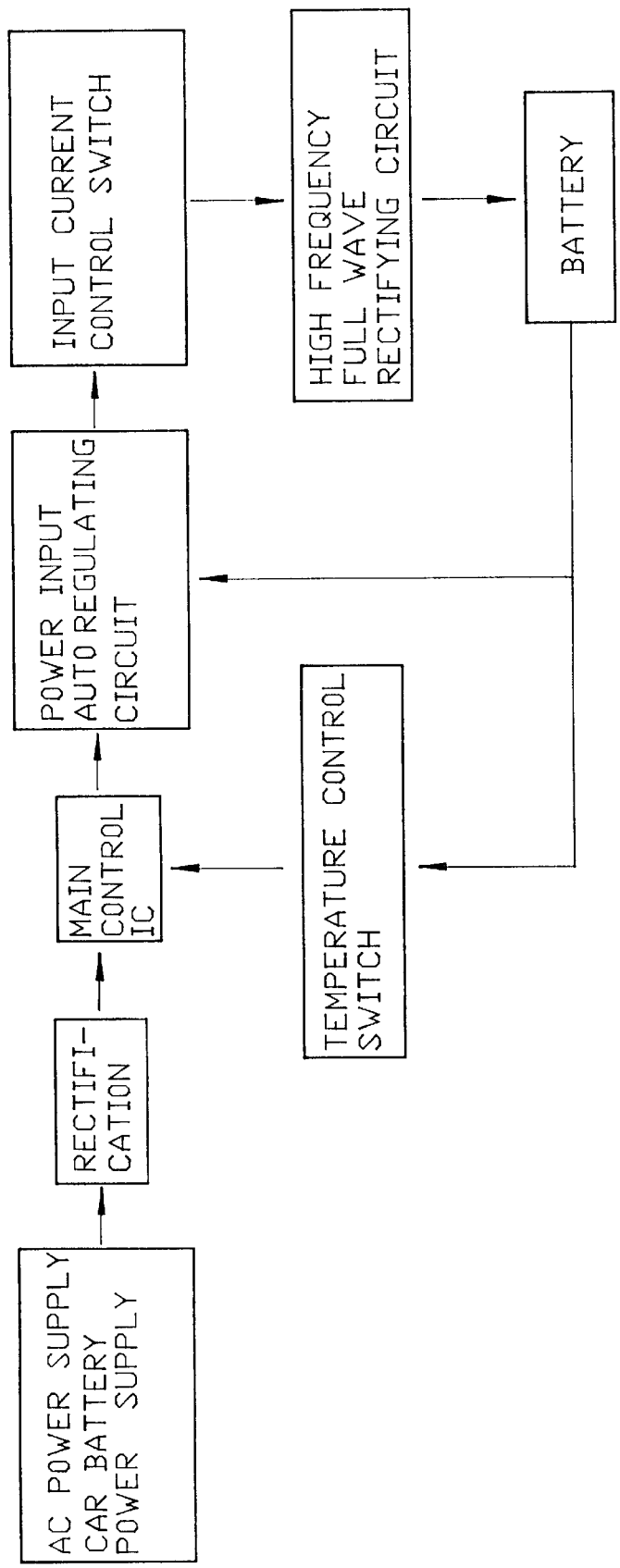
FIG. 5 is a control block diagram of the charging circuit of the battery.

Referring to FIGS. 5, the battery body 20 further provides a quick charging function. External AC power supply or car battery power supply is monitored by the power input protection system of the rectifier, then processed by the switch control, auto regulation, full wave rectification, and current switch of the charge input volume control system of the rectifier, and then monitored by the voltage switch and the temperature switch, and then controlled by the main control IC to charge the battery. When external power supply is rectified into a 12 V input power, the main control IC receives the signal of the temperature control gate circuit, and matches with the power input auto regulation circuit to let charging power be defined within a suitable input current subject to the existing power volume and temperature of the battery, and then sent to the current input control gate circuit, so that the defined input current can be rectified into the desired DC current by the high frequency full wave rectifying circuit for charging the battery. The power input auto regulation circuit, the current input control gate circuit, and the temperature control gate circuit form a charging circuit which regulates charging power and charges the battery subject to the conditions of the external power source and the battery. Because the present invention automatically monitors the conditions of the battery and regulates the input current, quick charging can be positively achieved (about one hour from zero to saturated status). In an actual test, input charging voltage Vin=12.05 V, input charging current Iin=0.925 A, total input charging power Pin=12.05*0.956=10.13; after charging, output voltage Vout=10.6 V, output current=0.956 A, total output power Pout=10.6*0.956=10.13 W, WPout=Pin-Pout=11.15 W−10.13 W=1.02 W, and the value of efficiency=WPout/Pin%=91.47%, i.e. about 92% superior than 80%—the average value of efficiency of regular cellular telephone battery.

It is to be understood that the drawings are designed for purposes of illustration only, and are not intended as a definition of the limits and scope of the invention disclosed.

I claim:

1. A cellular telephone battery comprising a battery body adapted for providing a cellular telephone with the necessary working power supply, said battery body comprising:

a current rectifying and voltage converting device adapted for rectifying and converting input power supply to the desired working power supply;

an auto-answer and hand-free control device connected to said current rectifying and voltage converting device, said auto-answer and hand-free control device comprising a control unit connected to the mainframe of the cellular telephone, a control button unit, a microphone, an indicator light, a speaker, two exchanging units, and an encoder/decoder/storage unit, one of said exchanging unit receiving the voice of the opponent from the cellular telephone and driving it out of said speaker, the other of said exchanging unit receiving the voice of the user from said microphone and sending it to the opponent through the cellular telephone.

2. The cellular telephone battery of claim 1 wherein said encoder/decoder/storage unit is to encode, compress, decode, and store voice signals, having the function of storing the user's announcement in which the user's voice is picked up by said microphone and transmitted to said encoder/decoder/storage unit through one of said exchanging units, then encoded and compressed by said encoder/decoder/storage unit and then stored in a read only memory in said encoder/decoder/storage unit, and the function of storing the caller's message in which said encoder/decoder/storage unit is controlled by said control unit to encode and compress the user's voice and then to store the encoded and compressed signal of the user's voice in a random access memory in said encoder/decoder/storage unit, the caller's message being simultaneously driven out of said speaker by one of said exchanging unit; said indicator light is driven by said control unit to flash when a message is stored in said encoder/decoder/storage unit.

3. The cellular telephone battery of claim 1 wherein voice picked up by said microphone is processed through said exchanging units, and then stored in a random access memory in said encoder/decoder/storage unit.

4. The cellular telephone battery of claim 1 wherein the control unit of said auto-answer and hand-free control device enters a low power sleep mode when the cellular telephone receives a stop signal to stop communication, and cuts off power supply from said encoder/decoder/storage unit before entering said lower power sleep mode; the user's announcement which is stored in said read only memory is maintained intact when power supply is cut off, and the caller's message which is stored in said random access memory is erased when power supply is cut off; said encoder/decoder/storage unit is maintained working in the same manner as said control unit receives a signal from said control unit when a message is stored in said encoder/decoder/storage unit; said control unit returns to normal power supply status when receives a signal from the cellular telephone.

5. The cellular telephone battery of claim 1 wherein said battery body provides a quick charging function in which external power supply is monitored by the power input protection system of a rectifier thereof, then processed by the switch control, auto regulation, full wave rectification, and current switch of a charge input volume control system of said rectifier, and then monitored by a voltage switch and a temperature switch thereof, and then controlled by a main control IC thereof to charge the battery; when external power supply is rectified into a DC input power, said main control IC receives the signal of said temperature control switch, and matches with said power input auto regulation circuit to let charging power be defined by said power input auto regulation circuit to a suitable input current subject to the existing power volume and temperature, and then sent to said current input control switch, so that defined input current can be rectified into the desired DC current by a high frequency full wave rectifying circuit for charging the battery.

* * * * *